United States Patent [19]

Hilmer

[11] Patent Number: 4,611,683

[45] Date of Patent: Sep. 16, 1986

[54] FARM TRACTOR

[76] Inventor: Elwyn P. Hilmer, P.O. Box 185, Yoncalla, Oreg. 97499

[21] Appl. No.: 556,561

[22] Filed: Nov. 30, 1983

Related U.S. Application Data

[63] Continuation-in-part of Ser. No. 286,241, Jul. 22, 1981, abandoned.

[51] Int. Cl.$^4$ .................. B62D 61/12; B62K 13/00
[52] U.S. Cl. ................................. 180/209; 180/234; 180/236; 180/900
[58] Field of Search ............. 180/234, 236, 327, 209, 180/900; 280/638, 456 A, 785, 786

[56] References Cited

U.S. PATENT DOCUMENTS

| | | | |
|---|---|---|---|
| 1,321,107 | 11/1919 | Kidney | 180/209 |
| 2,511,692 | 6/1950 | Brown | 280/638 |
| 2,580,480 | 1/1952 | Strehlow et al. | 180/900 |
| 2,619,361 | 11/1952 | Conners et al. | 180/900 |
| 2,796,140 | 6/1957 | Knolle | 180/900 |
| 3,568,778 | 3/1971 | Swisher, Jr. et al. | 180/327 |
| 4,270,621 | 6/1981 | van der Lely | 180/900 |

FOREIGN PATENT DOCUMENTS

| | | | |
|---|---|---|---|
| 1546412 | 11/1968 | France | 280/638 |
| 1465891 | 3/1977 | United Kingdom | 280/638 |

*Primary Examiner*—John J. Love
*Assistant Examiner*—Kenneth R. Rice

[57] ABSTRACT

A farm tractor with a high center frame between the front and rear axles to permit ASAE categorized three point implement hitches or the like to be located in the middle and rear of the tractor combined with four wheel, front and rear steering (auto type) to maintain the orientation of tractor body parallel to its direction of travel for accurate intercropping mounted implement tool tracking on hillsides slopes and to permit the tractor to be zigzagged laterally over the center of the center mounted implements.

22 Claims, 16 Drawing Figures

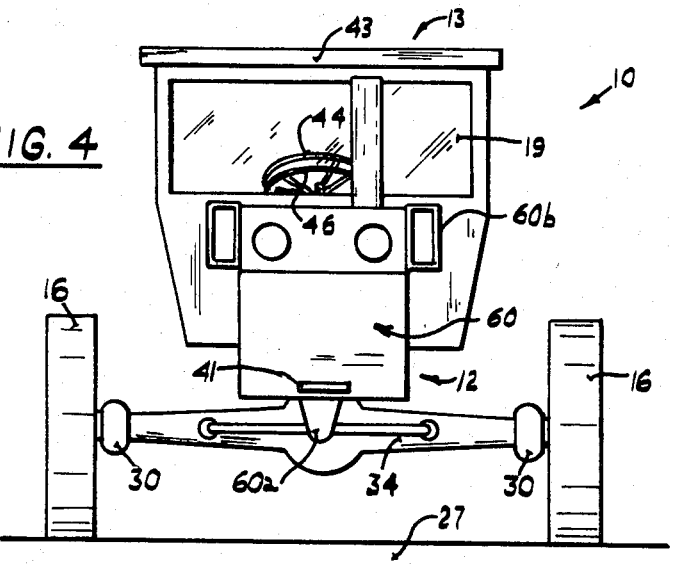
FIG. 4
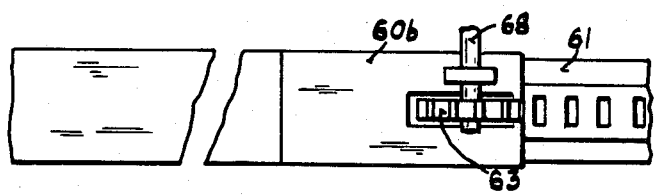
FIG. 5
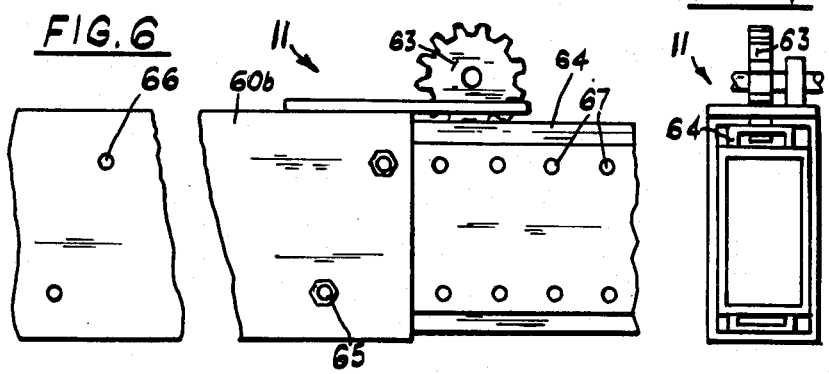
FIG. 6
FIG. 7

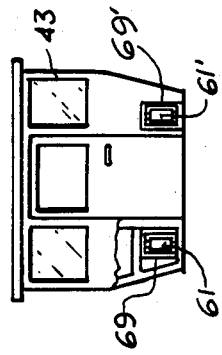
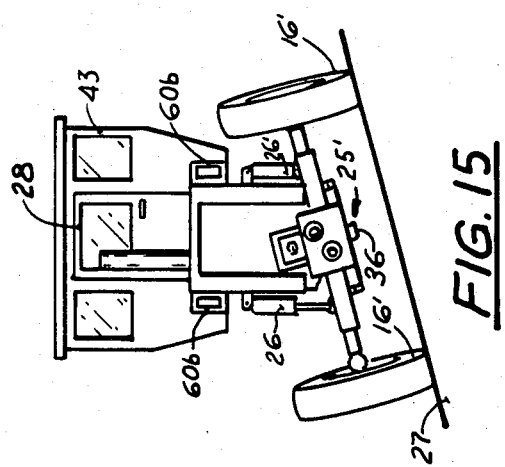
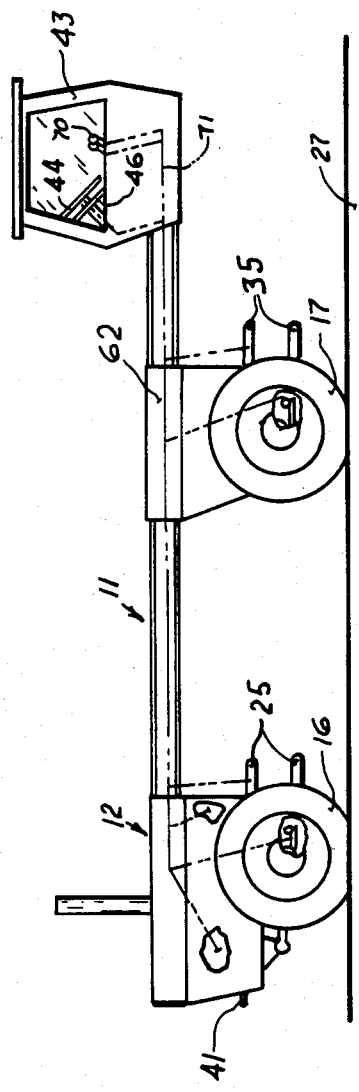
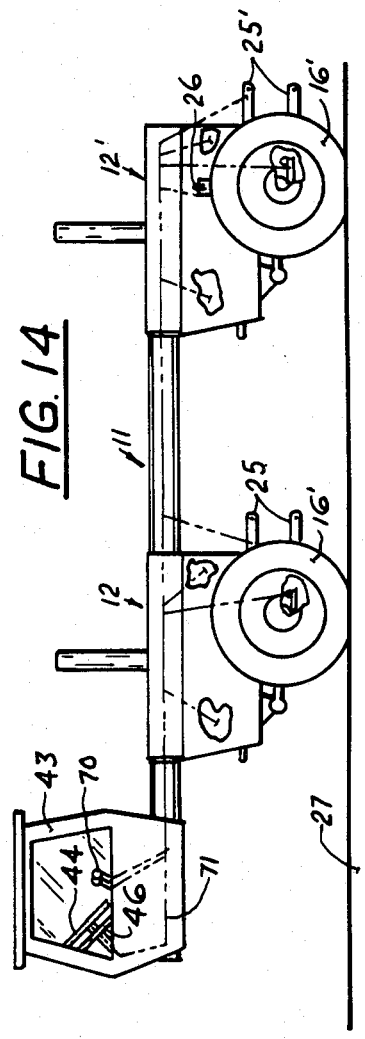

FARM TRACTOR

CROSS REFERENCE TO RELATED DOCUMENTS

This application is based on my Document Disclosure No. 088,761 titled "High Center Farm Tractor" dated Mar. 10, 1980 and is a continuation-in-part of U.S. Ser. No. 286,241, filed July 22, 1981 abandoned and entitled "Farm Tractor".

BACKGROUND OF THE INVENTION

The concept of farm tractors is well known in the art. There are farm tractors with rear wheel steering, front wheel steering, four wheel crab steering and four wheel coordinated steering. There are tractors with front wheel drive, rear wheel drive and four wheel drive. There are also many specialized tractors for use in production and harvesting of specialized crops. The present invention provides a tractor for use in farming of conventional crops such as oats, corn, soybeans and the like and, more specifically, a tractor for use with intercropping equipment that may be operated on slopes or side hills.

Briefly, intercropping involves the precise planting of a second crop in the center of the relative narrow spaces between the rows of a standing crop. Such a system of intercropping is more fully shown and described in my copending application U.S. Ser. No. 519,314, filed Aug. 1, 1983, and entitled "Soil Conservation Intercropping". Generally, if the planted area is on a slope, it is extremely difficult for the tractor and the wide interplanter implement to accurately follow the spaces between the rows of standing grain. The difficulty in driving a tractor on a side hill is that the tractor has a tendency to slip sideways down the hill as it works the field. Most farming is done on the contour of the slope of the field or perpendicular to the fall-line of the hill as a soil conservation practice.

If the implement is rear mounted, the tractor is unbalanced and the rear mounted implement causes the tractor to crab even more on side hills. In order to traverse a side hill on the contour of the slope one must turn the tractor wheels at a slight angle to the tractor body to maintain a straight tractor heading. Thus, as the tractor body traverses along a side hill, the tractor proceeds along a straight path with the tractor body located at a slight angle with respect to the path of the tractor. This angle is referred to as the crab angle.

In the first crop planting the lack of alignment between the axis of the tractor body and the line of the tractor's path can increase or decrease the width of the rows planted depending upon the degree of crab-tracking of the tractor. However, it is more difficult to plant a second crop in the center of the spaces between the rows of the first planted standing crop located on side hills or slopes with conventional rear mounted equipment, more particularly when using the wise swath equipment when intercropping. In addition, the displacement of the tractor wheels from the straight path produces a displacement in conjunction with the crab angle rotation which makes it difficult for a tractor with wide equipment mounted thereon to accurately follow the center of the narrow spaces between the rows of standing crops. Therefore when implements are mounted on the rear of a tractor, the problem is compounded. The present invention provides a tractor that can more accurately follow the centers of the narrow spaces between the rows of standing grain when interplanting.

The present invention provides an improvement by providing a tractor mounted, hydraulically operated, ASAE categoried three point hitch located in the center of the tractor, a toolbar and implement mounted thereon and four wheel crab steering which coact to minimize the crab angle effect. The high center frame allows clearance for the three point hitch mounted equipment. Another tractor mounted hydraulically operated ASAE categoried three point hitch is mounted at the rear of the tractor. This provides for a dual farming operation in one pass. For example, the central mounted three point hitch implement could till the soil and the rear three point hitch mounted equipment could then plant the tilled area. Both front and rear wheels can be steered independently to minimize the lack of alignment of the tractor body with the tractors direction of travel. The weight of the equipment is distributed equally on all four wheels of the tractor offering better steering and soil compaction is only half that of the conventional tractor.

DESCRIPTION OF THE PRIOR ART

Clearance between the lower side of tractors and the ground is a relative consideration in tractor design. Row-crop tractors evolved from a team of horses configuration. They adopted the tri-cycle design which put the front wheels forward the engine and under the frame tracking between two rows of crop. The height of the frame therefore was determined by the height of the wheels with clearance between the wheels and the frame.

The tractor mounted hydraulically operated three point hitch was rear mounted and came into being prior to World War II on a low-slung tractor. Another small low-slung tractor with center mounted equipment came into being after World War II; however, it did not use a rear mounted three point hitch, for the engine was located in that position, nor did it use a tractor mounted hitch for the center equipment.

Tri-cycle tractors have been made extendable with forward and rear sections reversible, yet the clearance beneath the tractor and the ground remained a small guide wheel height.

Specifications for the tractor mounted ASAE (American Society of Agricultural Engineers, 2950 Niles Road, Box 410, St. Joseph, Mich. 49085), categoried three point hitch have existed for more than two decades yet the idea of a center mounted and a rear mounted hydraulically operated three point hitch mounted on a tractor in combination with a high center frame had not yet come into being prior to the present invention. This combination along with independent front and rear axle steering provides an accurate means to intercrop two crops as a soil conservation measure.

BRIEF SUMMARY OF THE INVENTION

Briefly, the invention comprises a tractor having a front mounted engine section and a rear mounted cab section connected together by telescoping high center frame members. The tractor has sufficiently high center frame clearance to permit a center mounted ASAE categoried three point hitch to operate in a normal manner. The telescoping high center frame members permit the operator to extend the length of the tractor sufficiently to be able to zigzag maneuver the tractor laterally over the toolbar and equipment to be center mounted to the tractor. The operator then attaches the toolbar to the tractor's mid-portion ASAE categoried three point hitch, returns to the tractor's operating station, raises the center mounted tool, shortens the length of the tractor and drives to the field. Independent front and rear wheel crab steering permits the operator to better maintain the orientation of the tractor body with respect to the path of the tractor on sloping hillside fields.

In another arrangement, a high center frame tractor with a ASAE categoried three point hitch mounted centrally of the tractor and at the rear of the tractor is provided wherein the location of the leading front engine section and the trailing rear operator's section of the high center frame tractor are reversed. Both sections face the same direction of travel. Drive trains are powered in the same direction. The utility of having a center-of-the-tractor ASAE categoried three point hitch and a rear ASAE categoried three point hitch is still available.

This reversed configuration would provide a transport main frame for harvesting machines. The cutterbar or grain header would be mounted forward of the operators station for easy operational view. The processing section would be center of the front and rear sections and the rear hitch would tow the grain wagon, or no-till plant the next crop.

The advantages of the center-mounted toolbar are many. First the tractor and toolbar rig is far more balanced and stable, whether the toolbar is raised or in the operation position. The toolbar and equipment mounted thereon is supported both forward and rearward with relatively equal loading on all four wheels.

Secondly, the operators vision of the center-mounted working tool is greatly improved.

Furthermore, in another embodiment, two front engine sections are spaced apart and joined with a high center frame so as to provide double the horsepower available in one tractor. This configuration also provides for center and rear tractor mounted three point hitches, and independent front and rear axle steering. The operators station would be located on the high center frame of the tractor.

BRIEF DESCRIPTION OF THE DRAWINGS

FIG. 4 is a front view of the tractor;

FIG. 5 is a plan view of the extendible tractor frame;

FIG. 6 is a side view of the extendible tractor frame;

FIG. 7 is an end view of the extendible tractor frame;

FIG. 8 is a schematic diagram illustrating the mounting of a center mount implement;

FIG. 13 is a side elevation view with a leading front section, a trailing rear frame section and the operators station mounted on the high center frame;

FIG. 14 is a side elevation view with a leading front section, a trailing front section and the operators station mounted on the high center frame;

FIG. 15 is a rear elevation view of FIG. 14; and

FIG. 16 is a rear elevation view of cab and operators station mounted on high center frame.

DESCRIPTION OF THE PREFERRED EMBODIMENT

Figure 1:
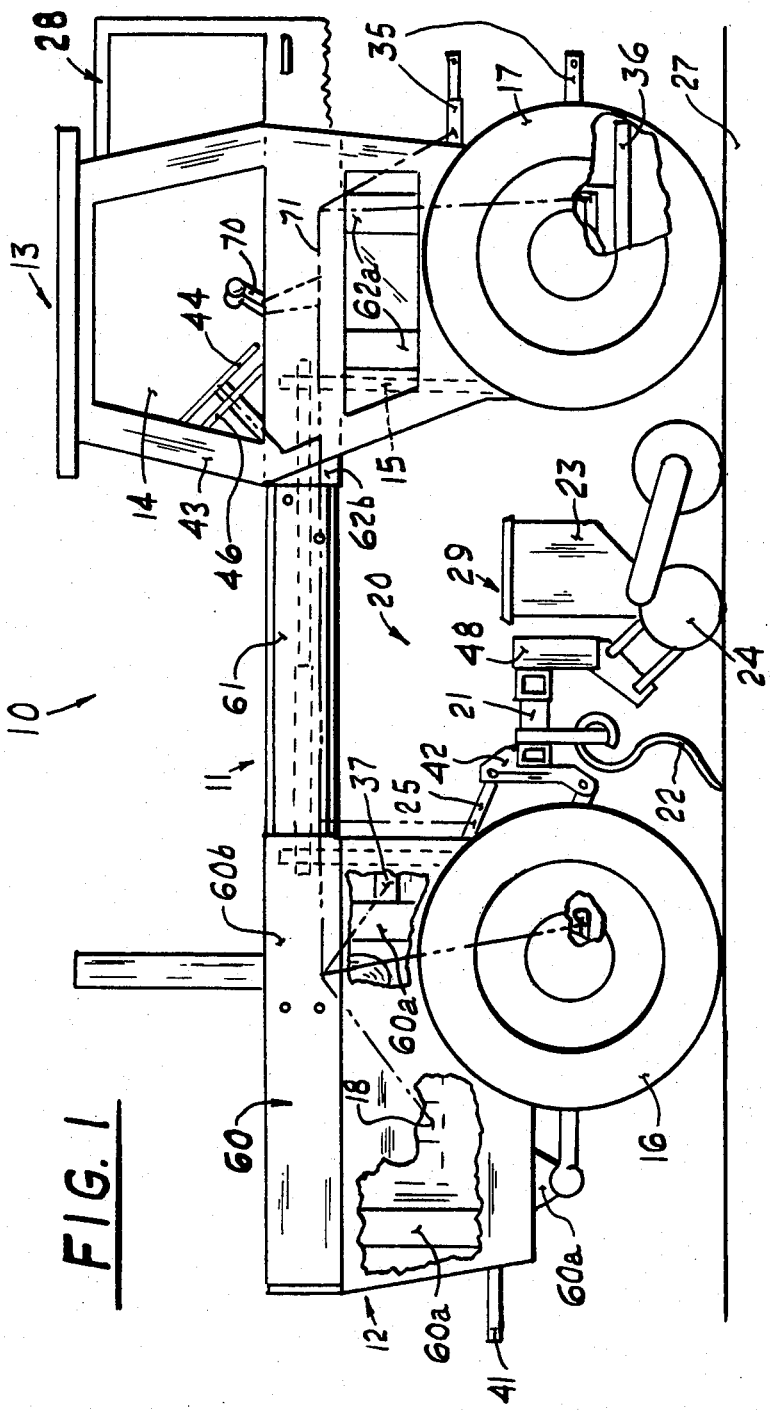
FIG. 1 is a side elevation view of the tractor with a ASAE categoried three point hitch center mounted implement.
Figure 2:
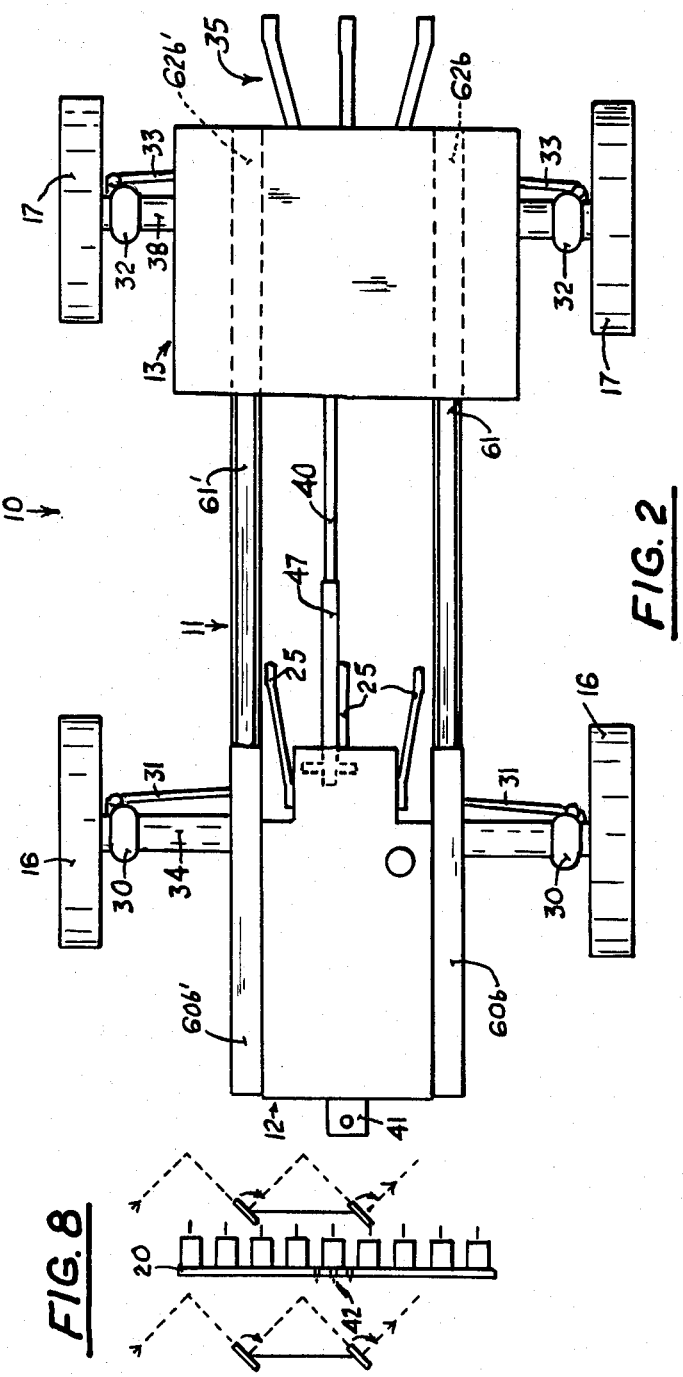
FIG. 2 is a top view of the tractor without a center mount implement and in a partially extended position.

Referring to FIGS. 1 and 2, numeral 10 generally designates a high center clearance tractor having a leading component comprises a front section 12, a rear section 13, and a high center frame 11 joining the two sections 12 and 13. Front section 12 includes a frame and hood 60, and engine, a portion of which, indicated at 18, is viewable through a broken away portion of the front section hood 60, located forwardly of a front axle 34 mounted on a downwardly extending frame weldment 60a, the corresponding hydraulic and transmission system, a portion of which, denoted 37, is also viewable through a broken away portion of the front section hood 60, an ASAE categoried three point hitch 25 and a telescoping drive train formed by sections 40 and 47 (see FIG. 2). Ground is represented by the numeral 27.

The rear section 13 includes an operator cab 43 with a door 28 (shown in FIG. 1) and side windows 14, 15 and a front window 19 (shown in FIG. 4). The rear section 13 also includes a frame 62, a downwardly depending frame weldment 62a which supports a rear axle 38, the telescoping drive train section 40, an ASAE categoried three point hitch 35, and a single straight towing hitch, a portion of which indicated at 36, is viewable through a broken away portion of a rear wheel 17, located below the three point hitch 35. This dual hitch arrangement is conventional and is found at the rear of most tractors today.

A further hitch 41, located forward of the engine 18 and supported by the lower portion of frame 60a, could be used in farm implement applications such as fertilizer applicators, insecticide applicators, or herbicide applicators provided this equipment is supported with caster wheels to the ground.

Figure 3:
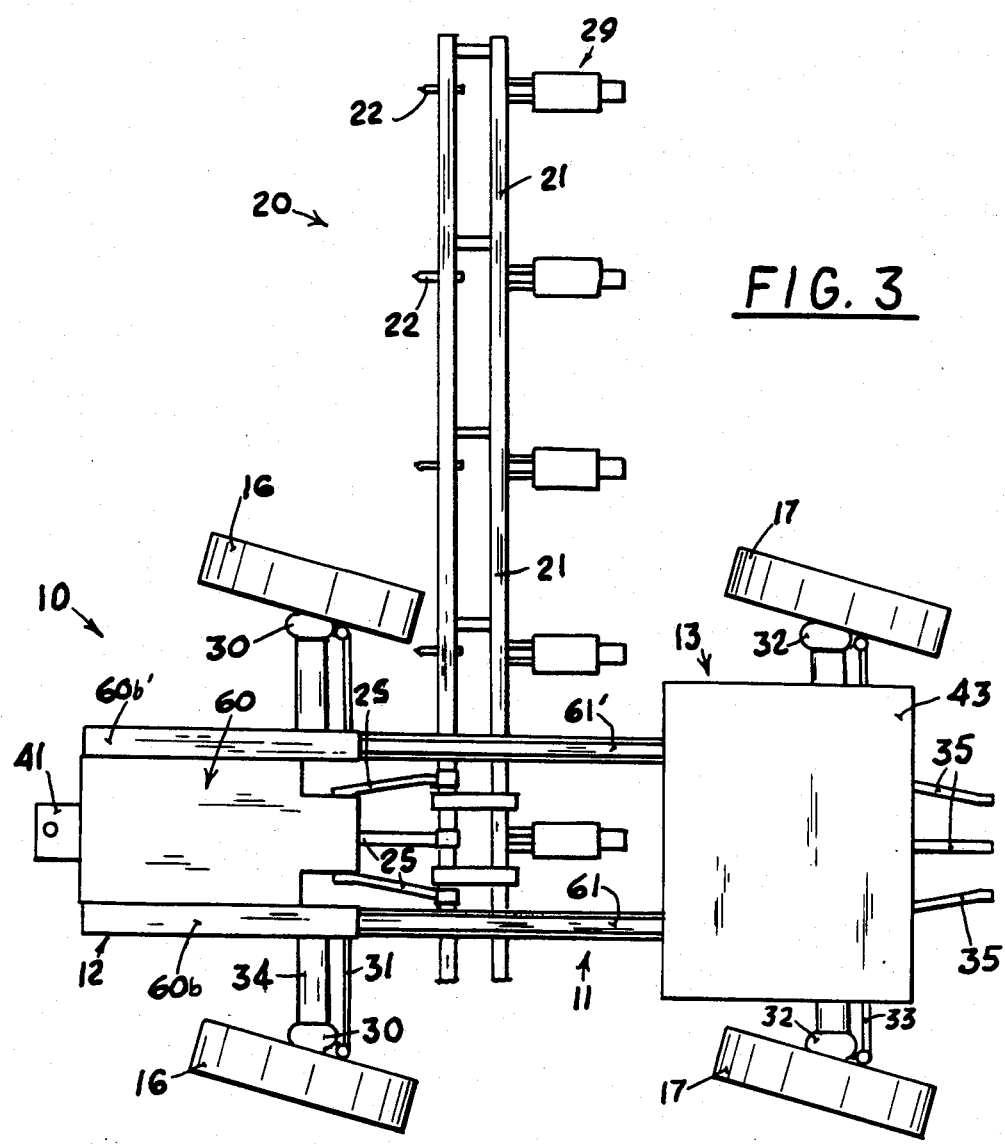
FIG. 3 is a top view of the tractor with a ASAE categoried three point hitch center mount implement.
Figure 11:
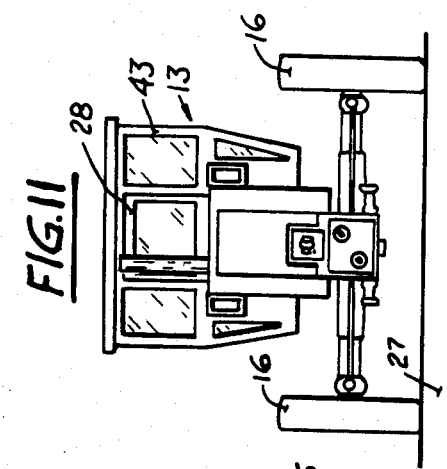
FIG. 11 is a rear elevation view of FIG. 9.
Figure 12:
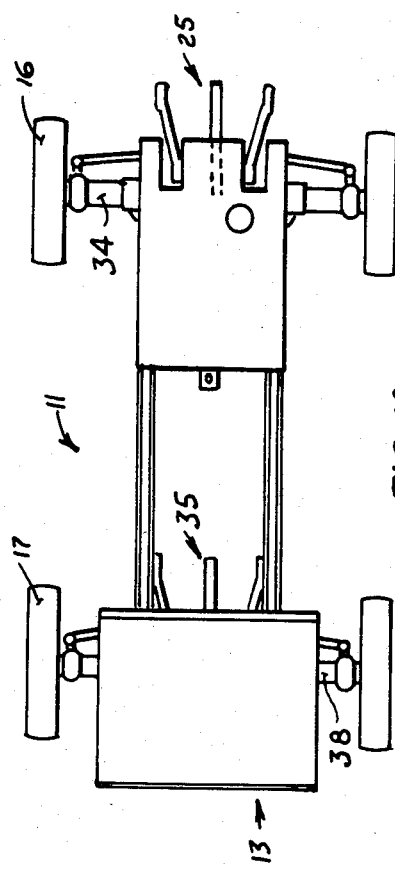
FIG. 12 is a plan view of FIG. 9.
Figure 9:
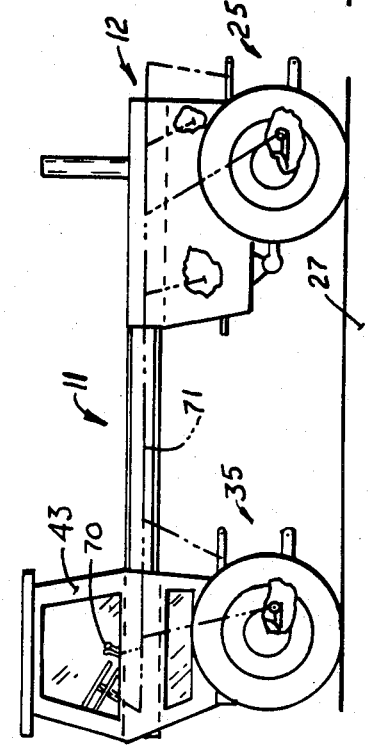
FIG. 9 is a side elevation view of the high center frame tractor with trailing front and leading rear sections.
Figure 10:
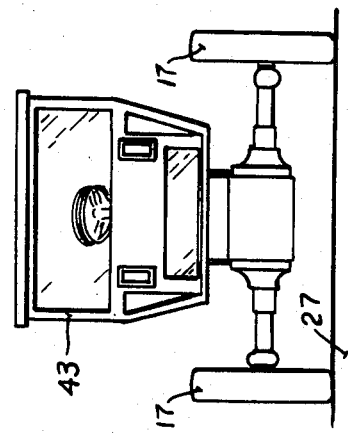
FIG. 10 is a front elevation view of FIG. 9.

In FIG. 2, a pair of front wheels 16 and rear wheels 17, mounted on axles 34 and 38, respectively, are located on opposite ends of the tractor 10 with wheels 16 being located forward of implement 20 and wheels 17 being located rearward of implement 20. Implement 20 comprises a toolbar 21 mounted to the tractor ASAE categoried three point hitch 25 through means of a mounting frame 42. The toolbar has no-till tines 22 mounted on the forward bar and supports a plurality of planter units 29, each comprising a support bracket 48, a seed box 23, disc openers 24, and a press wheel 45. The spring tines 22 are used for loosening the soil in front of disc openers 24. As noted above, implement 20 is connected to tractor 10 through frame 42 affixed to toolbar 21 and attached to the tractor's three point hitch 25. Toolbar 21, as shown in FIG. 3, extends a considerable distance from both sides of tractor 10. While an interplanter is shown it is apparent that other equipment could also be centrally mounted by three point hitch 25 on the tractor 10. Typical of other equipment which may be used are cultivators, graindrills, sprayers, fertilizer applicators, and the like. As shown in FIGS. 2 and 4, the front axle housing for axle 34 of tractor 10 has a pair of spindles 30 rotating therein and connected by a tie-rod 31 to a steering mechanism to provide independent front wheel steering which is hydraulically operated under the control of a steering wheel 44 located in the operator's cab 43. Similarly, rear axle 38 has a pair of spindles 32 with a tie-rod 33 connected thereto to provide independent rear wheel steering which is hydraulically operated under the control of a further steering wheel 46 also located in the operator's cab 43. Tractor 10 is shown with four wheel crab steering which is illustrated more clearly by the turned position of the wheels (FIG. 3). By crab steering it is meant that the front wheels and the rear wheels can be turned independently in the same direction by an operator, thereby providing control of the positions of the front and rear of the tractor at all times on a side slope.

The steering of the tractor 10 can be accomplished through a conventional crab steering mechanism which permits the operator to turn the front and rear wheels in the same direction, using steering wheels 44 and 46, from within the cab 43. Tractor 10 is powered by motor 18 through either the mechanical or hydraulic drive mechanism, indicated at 37 in FIG. 1, connected to the axles 34 and 38 for wheels 16 and 17, respectively.

Turning now to the details of the tractor, reference is made to FIG. 2 which shows the tractor front section 12 connected to the tractor rear section 13 through a pair of telescoping frame members 61 and 61' which are shown in greater detail in FIGS. 5, 6 and 7. Similarly, the telescoping drive mechanism, formed by sections 40 and 47, connects the front and rear sections of tractor so as to transmit power to the rear wheels 17 if a mechanical four wheel drive is used. Steering is provided hydraulically to the front tie-rod 31 and is actuated by the steering wheel 44 located in cab 43. Similarly, steering is provided hydraulically to the rear tie-rod 33 and is actuated by the steering wheel 46 located in cab 43. In the preferred embodiment, the telescoping frame members comprise a front section frame 60, box members 60b, a rear frame section 62, box members 62b telescope outside of frame members 61 and 61' which is also "box" shaped, i.e., rectangular in cross section, and thus constitutes a third box member, and which is located between box members 60b and 62b. As member 61 slides into frame 60b and frame 62b, they can either extend or bring together the front and rear tractor sections 12 and 13 or 62. FIGS. 5, 6 and 7 show the mechanism for telescoping the box members 60b, 62b in the form of gears 63 which engages a rack of mating teeth 64 on inner telescoping box members 61 and 61'. Through power supplied to shaft 68 from the tractor, or manually, one can rotate gears 63 clockwise or counterclockwise to either extend or bring together the front and rear tractor sections.

In the extended position of the high center frame formed by frame members 61 and 61' the tractor can be moved laterally over a center mount ASAE categorized three point hitch toolbar in a zigzag manner as illustrated in schematic form in FIG. 8, i.e., by positioning tractor along side of the end of the toolbar and then turning all four wheels in the direction of the toolbar center as the tractor is moved forward and rearwards in a zigzagging manner. In this way the operator can quickly and efficiently position the tractor to the middle of a toolbar implement. This eliminates the need for lifting and moving the three point hitch center mount implement under the high center frame. Once the tractor is aligned with the three point hitch mountings, the operator attaches the implement hitch 42 to ASAE categorized three point hitch 25 and lifts the implement off the ground. The operator then contracts the telescoping members 61 and 61' into frame 60b and/or frame 62b. He then fastens the telescoping members 60b, and 62b to members 61 and 61' through bolts and nuts 65 which fit into openings 66 and 67 to thereby hold the front section and rear section of the tractor in a rigid position with respect to one another through box members 60 and 61'. While a mechanical member is shown for telescoping the frame members, it is apparent that another mechanism such as a hydraulic mechanism could also be used. From an inspection of the drawings it is apparent that the term high center clearance tractor includes a vehicle in which the top structural portion of the front section of a tractor is connected to the top structural portion of the rear section of the tractor, this being accomplished in the illustrated embodiment by using frame members 61 and 61' or the like. It should be understood that the operator cab does not constitute a structural support of the tractor but it is only an area for the convenience of the operator.

FIGS. 9, 10, 11 and 12 illustrates a configuration in which the leading and trailing components or front and rear sections 12 and 13 of FIG. 1 are reversed in position so that the leading component comprises the "rear" section 13, including cab 43, and the section and trailing components comprises the 12, including engine 18. Both end sections 12 and 13 face the same direction. Both ASAE categorized three point hitches 35 and 25 are at the rear of both sections so that a toolbar can be either center-of-the-tractor mounted or rear mounted or both. This arrangement most notably provides a self propelled mobile main frame for harvesting equipment.

FIG. 13 shows a front section 12, a rear frame section 62, and a cab operators station 43 located on a high center frame in that order. The cab box frame members 69 and 69' telescope over the high center frame 61 and 61' and are fastened together with bolts and nuts 65. ASAE categorized three point hitches 25 and 35 are preferably located at the rear of the front section 12 and rear frame section 62. This configuration retains the center-of-the-tractor toolbar and equipment mounting. Both sections would have the auto-steerable option.

FIG. 14 shows a form of tractor wherein the leading and trailing components two spaced apart front sections 12 and 12' joined together with a high center frame 11 to increase the tractors output horsepower as shown. The operators station and/or cab 43 can be supported forward the tractor with extended high center frame members 60 and 60'. A ASAE categorized three point hitch 25 is preferably located at the rear of both sections 12 and 12' which face the same direction. This configuration retains the center-of-the-tractor toolbar and equipment mounting. Both sections would have the auto-steerable option.

FIGS. 13 and 14 show the cab location far rearward and far forward the tractor itself with engine steering and hitch controls located in cab 43. The remote cab locations on the tractor keep the tractor operator at the fartherest proximity of herbicide and insecticide spray and granular applications, and therefore, reduces incidence of cancer common with the farmer working in this environment. In FIG. 13, for example, the herbicide sprayer would be mounted forward the tractor on hitch 41. In FIG. 14, for example, the granular insecticide dispenser on a planter would be mounted on hitch 25 at the rear of the tractor. FIGS. 1, 9, 13, and 14; show operating controls 70, and schematically trace the corresponding control linkage 71 from the operating controls to the front section 12, or sections 12 and 12', the rear section 13, the new rear frame section 62 and the high center frame 11. The controls are located at the operators station 43 on the rear section 13 or remotely located on the high center frame 11. This enables the operator of the tractor to control all functions of the tractor 10.

FIG. 15 shows a tractor leveling device on a sloping hillside rear view of FIG. 14. This conventional arrangement is possible with this tractor with the addition of hydraulic cylinders 26 and 26' and controls in cab 43. Please note, wheels 16' and 16' are turned slightly uphill to maintain the tractors straight line travel path when on a steep slope.

The twin engine sections arrangement in FIG. 14 could better adapt to harvesting and dual processing equipment. For example, a corn crop could be chopped in the field, the grain separated from the fodder, each then loaded on two wagons simultaneously. Potatoes could be dug, processed and loaded on to a truck in one operation. Sugar beets could be dug, cleaned, and loaded in a conveyance as one continuous operation.

Although the invention has been described relative to exemplary embodiments thereof, it will be understood by those skilled in the art that variations and modifications can be effected in these exemplary embodiments without departing from the scope and spirit of the invention.

I claim:

1. An intercropping farm tractor apparatus including connected leading and trailing components comprising:
    a leading front section, a trailing rear section, a high center frame for connecting said leading front and trailing rear sections, and means for attaching said high center frame to said leading front section, said trailing rear section;
    said leading front section including a front section frame, a low elongated transverse drive axle supported from said front section frame and auto-type steerable wheels mounted on the opposite ends thereof;
    an engine supported from said front section frame for driving said wheels;
    reversible drive means drivingly connecting said engine to the wheels of said drive axle;
    a standard ASAE three point hitch mounted on said front section frame and extending therefrom rearward of said front section frame;
    means for operating said standard ASAE three point hitch;
    means for steering said wheels;
    said trailing rear section including a rear section frame, a low elongated transverse rear section axle supported from said rear section frame having wheels mounted on the opposite ends thereof;
    the wheels of said leading front and trailing rear section axles defining substantially the same wheel track width and being disposed in front-to-rear alignment laterally of said apparatus;
    said high center frame being spaced above said standard ASAE three point hitch sufficient to allow the latter to lift a three point hitch mounted implement fully above the ground upon which said wheels rest independent of interference between said standard ASAE three point hitch, three point hitch mounted implement and said high center frame;
    hitch means mounted on said trailing rear section extending rearwardly of rear section frame; and
    an operators station.

2. The intercropping farm tractor apparatus of claim 1 wherein said trailing rear section axle wheels comprising auto-type steerable wheels; and
    means for steering said trailing rear section axle wheels independently of said leading front section drive axle wheels.

3. The intercropping farm tractor apparatus of claim 1 wherein said trailing rear section axle comprise a drive axle;
    reversible drive means drivingly connecting said leading front section engine to said trailing rear section drive axle wheels.

4. The intercropping farm tractor apparatus of claim 1 wherein said hitch is a second standard ASAE three point hitch; and
    means for operating said second standard ASAE three point hitch.

5. The intercropping farm tractor apparatus of claim 4 wherein the leading front section and trailing rear section are to be reverse mounted on said high center frame with both sections facing the same direction of travel, said apparatus further comprising means for attaching said frame to trailing front and leading rear sections in the reverse mounted arrangement, and means for routing operational controls to said operators station.

6. An intercropping farm tractor apparatus including connected leading and trailing components comprising:
    a leading rear section, a trailing front section, a high center frame for connecting said leading rear and trailing front sections, and means for attaching said high center frame to said leading rear section, said trailing front section;
    said leading rear section including a rear section frame, a low elongated transverse axle supported from said rear section frame and wheels mounted on the opposite ends thereof;
    a standard ASAE three point hitch mounted on said leading rear section frame and extending therefrom rearwardly of said leading rear section frame;
    an operators station means;
    means for operating said standard ASAE three point hitch;
    said trailing front section including a front section frame, a low elongated transverse front section drive axle supported from said front section frame and auto-type steerable wheels mounted on the opposite ends thereof;
    an engine supported from front section frame for driving said wheels;
    reversible drive means drivingly connecting said engine to the wheels of said drive axle;
    means for steering said wheels;
    hitch means mounted on said trailing front section and extending reardwardly of front section frame;
    the wheels of said leading rear and trailing front section axles defining substantially the same wheel track width and being disposed in front-to-rear alignment laterally of said apparatus;
    said high center frame being spaced above said standard ASAE three point hitch sufficient to allow the latter to lift a three point hitch mounted implement fully above the ground upon which said wheels rest independent of interference between said standard ASAE three point hitch, three point hitch mounted implement and the said high center frame.

7. The intercropping farm tractor apparatus of claim 6 wherein said leading rear section axle wheels comprising auto-type steerable wheels; and
    means for steering said leading rear section axle wheels independently of said trailing front section drive axle wheels.

8. The intercropping farm tractor apparatus of claim 6 wherein said leading rear section axle comprises a drive axle; and
    revesible drive means drivingly connecting said trailing front section engine to said leading rear section drive axle wheels.

9. The intercropping farm tractor apparatus as claimed in claims 1 or 6 wherein said operators station is mounted on said rear section; and
    means for routing operational controls to said operators station.

10. An intercropping farm tractor apparatus including connected leading and trailing components comprising:
    a leading front section, a trailing rear frame section, a high center frame for connecting said leading front and trailing rear frame sections, and means for attaching said high center frame to said leading front section, said trailing rear frame section;
    said leading front section including a front section frame, a low elongated transverse drive axle supported from said front section frame and auto-type steerable wheels mounted on the opposite ends thereof;
    an engine supported from said front section frame for driving said wheels;
    reversible drive means drivingly connecting said engine to the wheels of said drive axle;
    a standard ASAE three point hitch mounted on said front section frame and extending therefrom rearward of said front section frame;
    means for operating said standard ASAE three point hitch;
    means for steering said wheels;
    said trailing rear frame section including a rear section frame, a low elongated transverse rear section axle supported from said trailing rear section frame having wheels mounted on the opposite ends thereof;
    the wheels of said leading front and trailing rear frame section axles defining substantially the same wheel track width and being disposed in front-to-rear alignment laterally of said apparatus;
    said high center frame being spaced above said standard ASAE three point hitch sufficient to allow the latter to lift a three point hitch mounted implement fully above the ground upon which said wheels rest independent of interference between said standard ASAE three point hitch, three point hitch mounted implement and said high center frame;
    hitch means mounted on said trailing rear frame section extending rearwardly of rear section frame; and
    an operators station means.

11. The intercropping farm tractor apparatus of claim 10 wherein said trailing rear frame section axle wheels comprising auto-type steerable wheels; and
    means for steering said trailing rear frame section axle wheels independently of said front section drive axle wheels.

12. The intercropping farm tractor apparatus of claim 10 wherein said trailing rear frame section axle comprises a drive axle;
    reversible drive means drivingly connecting said leading front section engine to said trailing rear frame section drive axle wheels.

13. An intercropping farm tractor apparatus including connected leading and trailing components comprising:
    a leading front section, a trailing front section, a high center frame for connecting said leading front and trailing front sections, and means for attaching said high center frame to said leading front section, said trailing front section;
    said leading front section including a front section frame, a low elongated transverse drive axle supported from said front section frame and auto-type steerable wheels mounted on opposite ends thereof;
    an engine supported from said leading front section frame for driving said wheels;
    reversible drive means drivingly connecting said engine to the wheels of said leading front section drive axle;
    a standard ASAE three point hitch mounted on said leading front section frame and extending therefrom rearward of said leading front section frame;
    means for operating said standard ASAE three point hitch;
    means for steering said wheels;
    said trailing front section including a front section frame, a low elongated transverse drive axle supported from said front section frame and wheels mounted on opposite ends thereof;
    an engine supported from said trailing front section frame for driving said wheels;
    reversible drive means drivingly connecting said engine to the wheels of said trailing front section drive axle;
    the wheels of said leading front and trailing front sections axles defining substantially the same wheel track width and being disposed in front-to-rear alignment laterally of said apparatus;
    said high center frame being spaced above said standard ASAE three point hitch sufficient to allow the latter to lift a three point hitch mounted implement fully above the ground upon which said wheels rest independent of interference between said standard ASAE three point hitch, three point hitch mounted implement and said high center frame;
    an operators station means; and
    hitch means mounted on said trailing front section extending rearwardly of said trailing front section frame.

14. The intercropping farm tractor apparatus as claimed in claim 13 wherein trailing front section said axle and wheels are auto-type steerable independent of said leading front section drive axle wheels; and
    means for steering said wheels independently of said leading front section drive axle wheels.

15. The intercropping farm tractor apparatus as claimed in claims 10 or 13 wherein said operators station is mounted on said high center frame and means for attaching operators station to said high center frame; and
    means for routing operational controls to said operators station.

16. The intercropping farm tractor apparatus as claimed in claims 1, 6, 10 or 13, wherein high center frame is logitudinally extendible and retractible.

17. The intercropping farm tractor apparatus of claim 16 wherein said longitudinally extendible and then retractible means comprise a pair of laterally spaced frame members mounted in telescoping relationship with respect to said front and rear sections.

18. The intercropping farm tractor apparatus of claims 1, 6, 10 or 13, wherein said engine is disposed at least substantially fully forward of said front section drive axle.

19. The intercropping farm tractor apparatus of claims 1, 6, 10 or 13, wherein said engine is disposed at least substantially fully below said high center frame.

20. The intercropping farm tractor apparatus of claims 1, 6, 10 or 13, wherein said hitch is a second standard ASAE three point hitch; and
    means for operating said second standard ASAE three point hitch.

21. The intercropping farm tractor apparatus of claims 1, 6, 10 or 13, wherein a second said hitch is a tow hitch.

22. The method of mounting an equipment supporting toolbar to a standard ASAE three point hitch extending rearwardly of a leading section of an intercropping farm tractor, including a longitudinally extendible then retractible high center frame with front and rear sections mounted from forward and rearward end portions of said high center frame with each section equipped with a transverse axle and each axle equipped with opposite ends steerable wheels, the wheels on each axle being steerable independently of the other axle and at least the wheels of one of said axles being selectively reversibly driveable, said method comprising:
    positioning the intercropping farm tractor outwardly of one end of the toolbar with the tractor extending transverse to the longitudinal extent of the toolbar;
    extending the length of the high center frame of the tractor;
    oppositely steering the wheels of said axles in conjuntion with alternate forward and rearward movements of the tractor to crab-wise move said tractor, during said forward and rearward movements, in one lateral direction to a position with said tractor disposed over said toolbar and with the latter spaced between said axles;
    stopping the tractor at generally the center of said toolbar;
    coupling the toolbar to the hitch of the tractor;
    retracting the length of the high center frame of the tractor to the desired length;
    actuating the hitch to elevate the toolbar to a level spaced above the ground to enable the tractor to thereafter transport the toolbar and equipment or implement supported therefrom to a field use.

* * * * *